April 4, 1961 H. J. BARTA 2,978,558

CIRCUIT INTERRUPTER OPERATING MEANS

Filed May 28, 1959 9 Sheets-Sheet 1

INVENTOR.
Henry J. Barta,
BY
Robert R. Lockwood
atty.

CIRCUIT INTERRUPTER OPERATING MEANS

INVENTOR.
Henry J. Barta,
BY
Robert R. Lockwood
Atty.

CIRCUIT INTERRUPTER OPERATING MEANS

Filed May 28, 1959 9 Sheets-Sheet 3

INVENTOR.
Henry J. Barta,
BY
Robert R. Lockwood
Atty.

April 4, 1961 H. J. BARTA 2,978,558

CIRCUIT INTERRUPTER OPERATING MEANS

Filed May 28, 1959 9 Sheets-Sheet 4

INVENTOR.
Henry J. Barta,
BY
Robert R. Lockwood
Atty.

CIRCUIT INTERRUPTER OPERATING MEANS

Filed May 28, 1959 9 Sheets-Sheet 5

INVENTOR.
Henry J. Barta,
BY
Robert R. Lockwood
Atty.

CIRCUIT INTERRUPTER OPERATING MEANS

Filed May 28, 1959

9 Sheets-Sheet 6

INVENTOR.
Henry J. Barta,
BY
Robert R. Lockwood
Atty.

April 4, 1961 H. J. BARTA 2,978,558

CIRCUIT INTERRUPTER OPERATING MEANS

Filed May 28, 1959 9 Sheets-Sheet 7

INVENTOR.
Henry J. Barta,
BY Robert R. Lockwood
Atty.

CIRCUIT INTERRUPTER OPERATING MEANS

Filed May 28, 1959

9 Sheets-Sheet 8

INVENTOR.
Henry J. Barta,
BY Robert R. Lockwood
atty

April 4, 1961 H. J. BARTA 2,978,558

CIRCUIT INTERRUPTER OPERATING MEANS

Filed May 28, 1959 9 Sheets-Sheet 9

INVENTOR.
Henry J. Barta,
BY
Robert R. Lockwood
atty 2,978,558

CIRCUIT INTERRUPTER OPERATING MEANS

Henry J. Barta, Brookfield, Ill., assignor to S & C Electric Company, Chicago, Ill., a corporation of Delaware Filed May 28, 1959, Ser. No. 816,555

17 Claims. (Cl. 200—146)

This invention relates, generally, to circuit interrupter operating means and it has particular relation to the control, either directly or indirectly, of the member through which an operating force is applied to close or open the circuit interrupter. This invention is an improvement over the circuit interrupter operating means or control means disclosed in application Serial No. 704,397, filed December 23, 1957. It can be used in conjunction with the switch operating mechanism of U.S. Patent No. 2,796,478, issued June 18, 1957.

In the application above referred to there is disclosed a three pole circuit interrupter, each pole comprising a disconnecting switch of the beaver tail type and a series connected load current interrupter. In opening the circuit, the blade of the disconnecting switch of each pole first is rotated about its longitudinal axis to relieve contact pressure while maintaining the circuit and then a spring driven operating mechanism is released to open the contacts of the associated current interrupter where the circuit is quickly opened and any arc drawn is extinguished. This operation is controlled by a rotating insulator for each pole. Each insulator rotates through somewhat more than 90° from closed to open position and, during the initial portion of such rotation, the functions just described occur. As the insulator of each pole continues to rotate, the corresponding switch blade is swung through about 90° to an open position, the spring of each operating mechanism is recocked, and the contacts of each current interrupter are reclosed. On reversal of the direction of rotation of each insulator, each switch blade is swung toward the closed position and the circuit is completed between it and the associated line contact since the contacts in the series connected current interrupter are closed.

It is desirable that provision be made for insuring that the circuit opening and closing operations be continued to completion once they have been initiated. Control means are provided for the circuit interrupter above referred to including a pawl and ratchet mechanism which functions during the circuit opening operation to prevent reverse rotation of an operating handle, once it has been rotated in the circuit opening direction, until the sequence of opening operations as described above has been completed. During the circuit closing operation, as the switch blade approaches the fully closed position, there may be circumstances which require that there be a reversal of the closing movement of the switch blade. When this occurs, the control means functions to permit such reversal but also requires that the complete sequence of opening operations be repeated before another circuit closing operation can be initiated.

The control means just referred to and disclosed in the above application functions in a satisfactory manner to accomplish the desired sequencing of operations. However, that control means is relatively bulky, employs a relatively large number of parts that are expensive to construct, and is somewhat sensitive in its adjustment.

Accordingly, among the objects of this invention are: To provide an improved control means of the type described that is simple and efficient in operation, relatively small in size, and which can be readily and economically manufactured and installed; to prevent the closure of the disconnecting switch while the load current interrupter is in the open position; to provide for directly interconnecting a rotatable operating member and a rotatable switch operating member in a new and improved manner; to accomplish the direct interconnection by a shaft which is rotatably mounted in a stationary housing that is provided with inwardly facing ratchet teeth with which a pawl on the shaft cooperates in a new and improved manner; to employ such an arrangement for preventing the closure of the disconnecting switch while the load current interrupter is in the open position; to provide for holding the pawl out of engagement with the ratchet teeth as long as the shaft is rotated without reversal in a direction to close the circuit; to cause the pawl to engage the next ratchet tooth upon reversal of rotation of the shaft from a circuit closing direction and subsequent attempt to again rotate it in a circuit closing direction; to employ an annular control ring rotatable in the housing and having a transversely extending slot through which a detent extending from the pawl projects for controlling the position of the pawl relative to the ratchet teeth; to employ a control arm rotatable on the shaft in lieu of the annular control ring to perform the same functions; and to employ the control device the functions of which have been enumerated hereinbefore either for the transmission of operating torque therethrough or for insuring that the circuit opening and closing operations be accomplished in predetermined sequence.

Other objects of this invention will, in part, be obvious and in part appear hereinafter.

This invention is disclosed in the embodiments thereof shown in the accompanying drawings and it comprises the features of construction, combination of elements and arrangement of parts that will be exemplified in the constructions hereinafter set forth and the scope of the application of which is indicated in the appended claims.

For a more complete understanding of the nature and scope of this invention reference can be had to the following detailed description, taken together with the accompanying drawings, in which.

Figure 1:
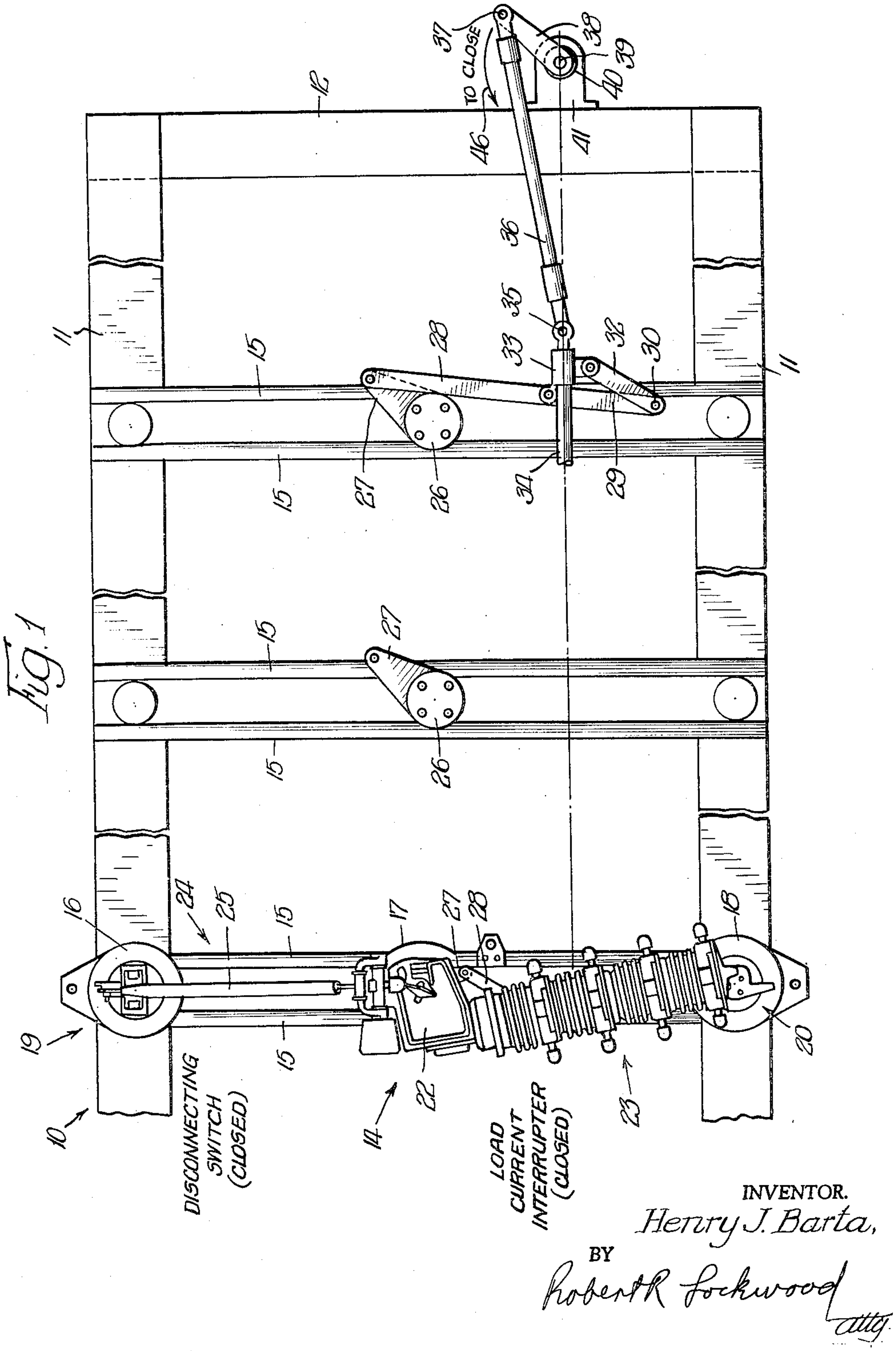
Figure 1 is a top plan view showing the switch means of the application referred to above and arranged to be operated through the circuit interrupter control means of the present invention, the switch means for one pole being shown in closed position and the rotatable fittings for the other switch means being shown in positions corresponding to the open positions of the respective switch means.
Figures 2, 8:
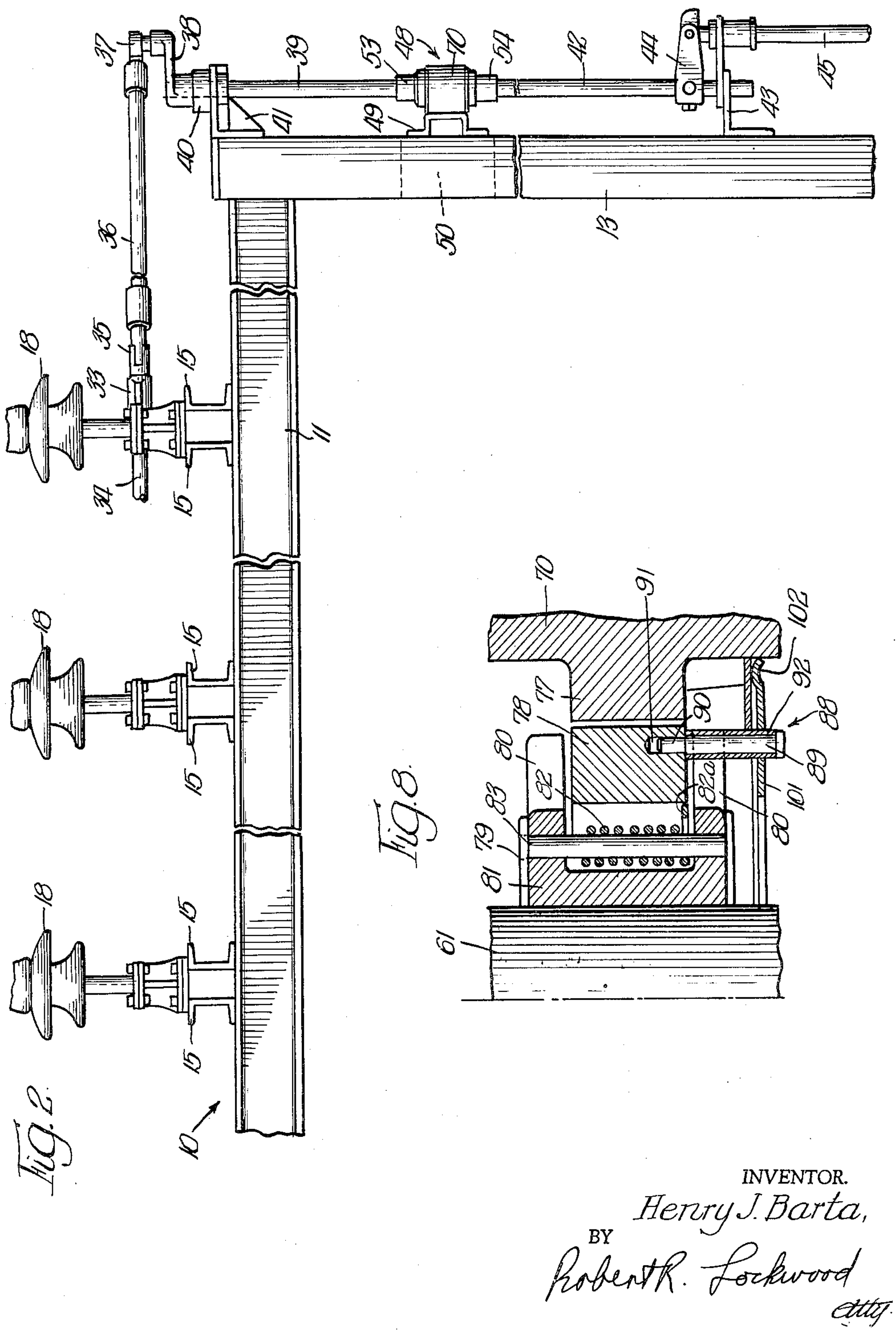
Figure 2 is a view, in side elevation, of the structure shown in Figure 1, only portions of the nearest insulators being shown.
Figure 8 is a detail sectional view taken generally along the line 8—8 of Figure 5.
Figure 14:
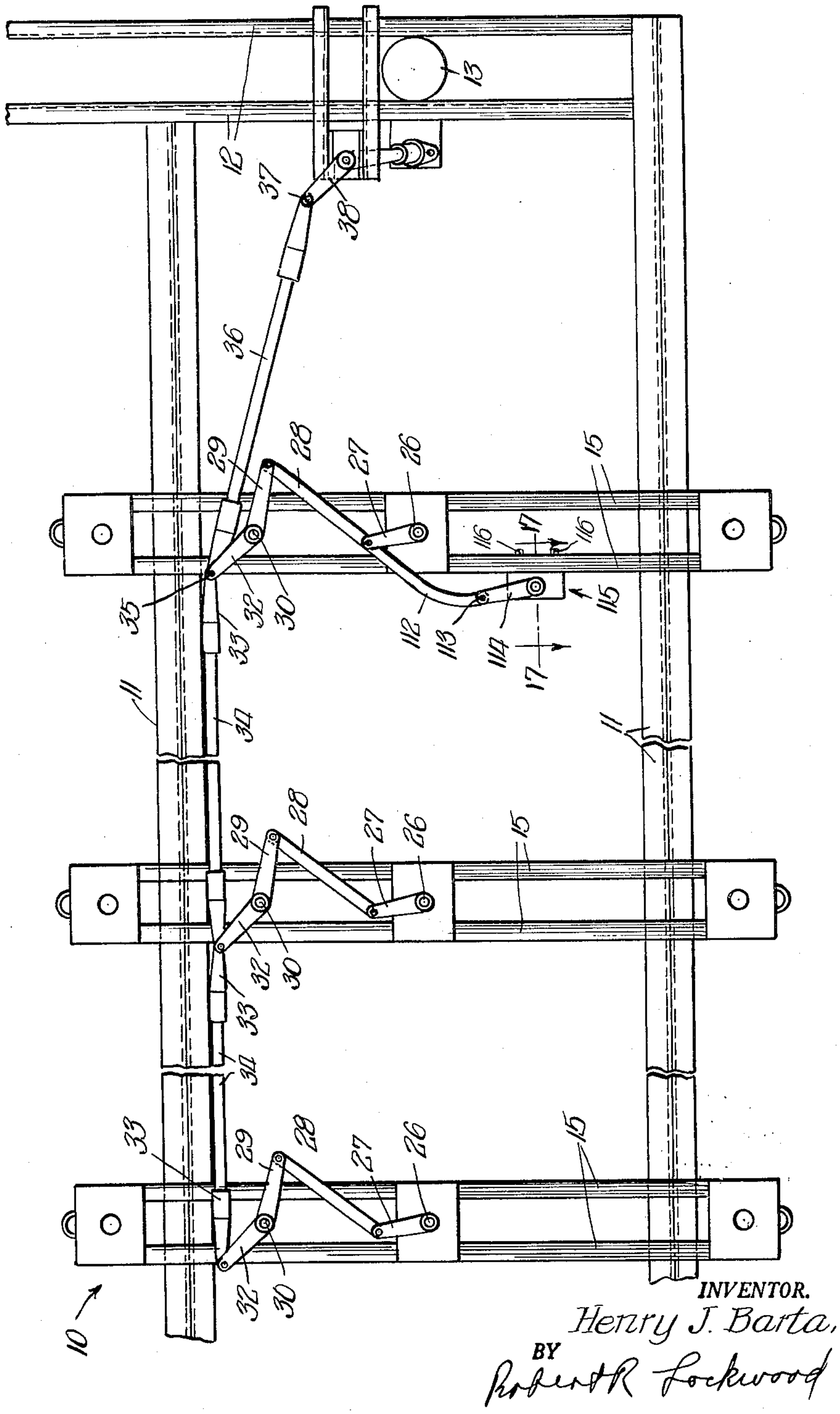
Figures 15, 16:
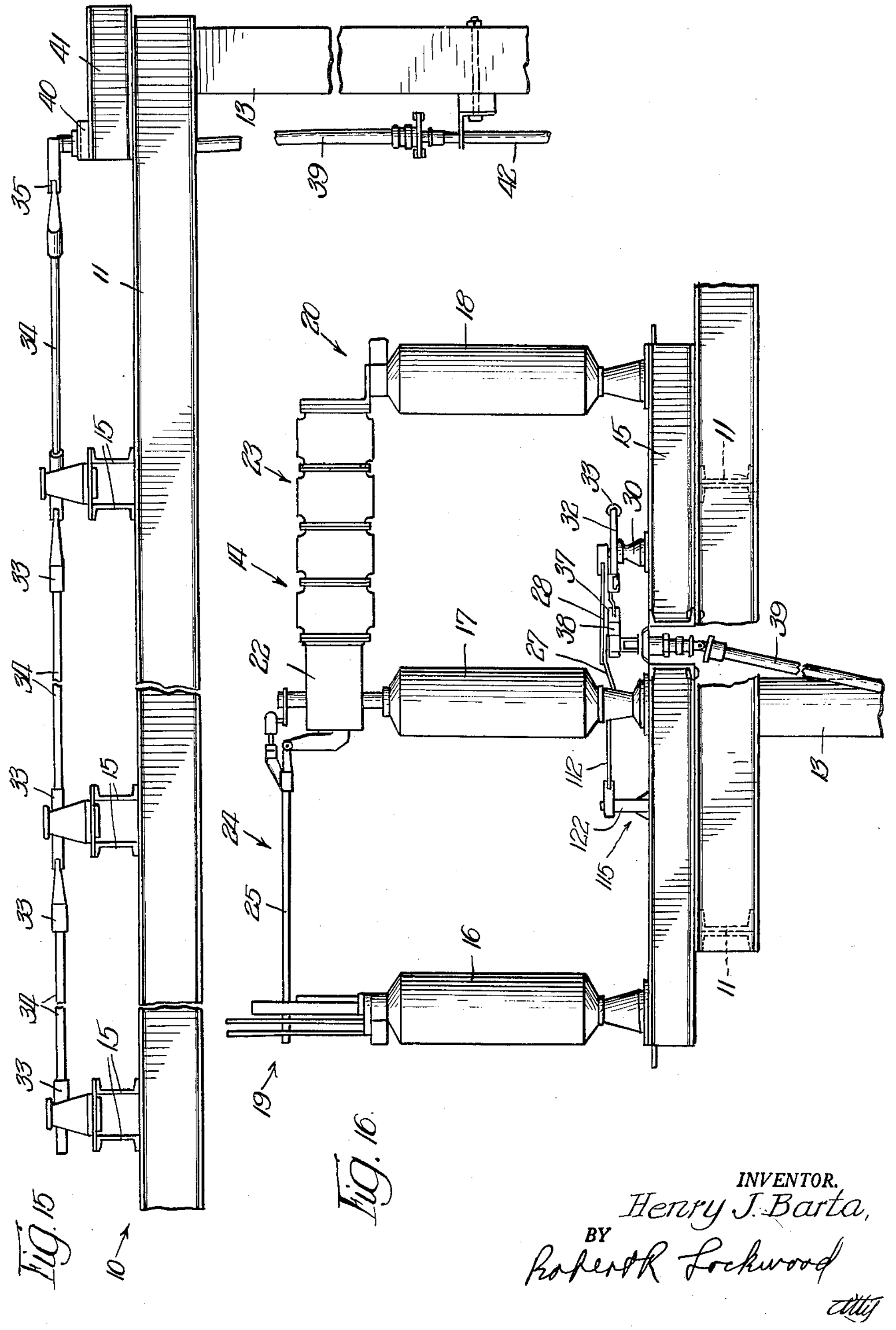
Figure 18:
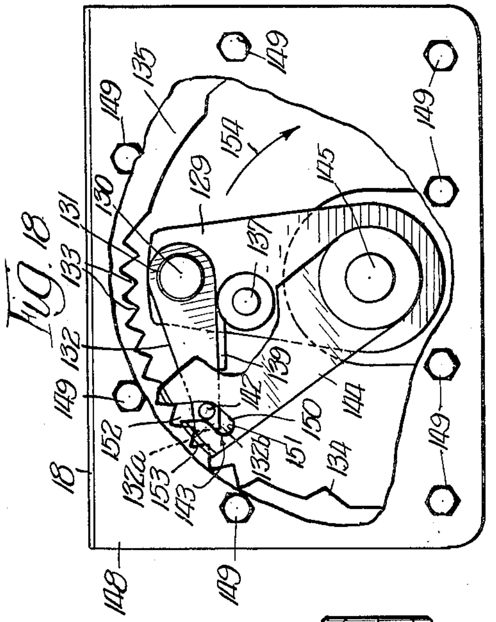
Figure 20:
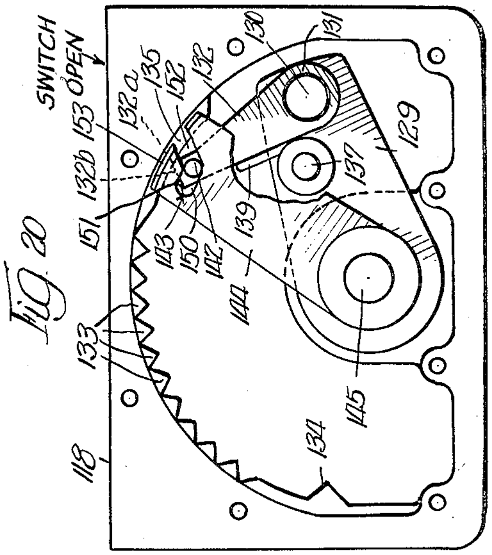
Figure 17:
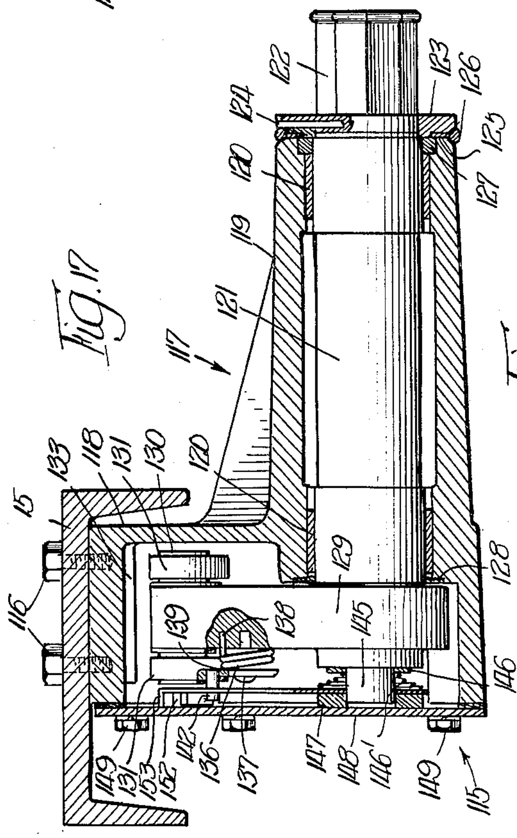
Figure 19:
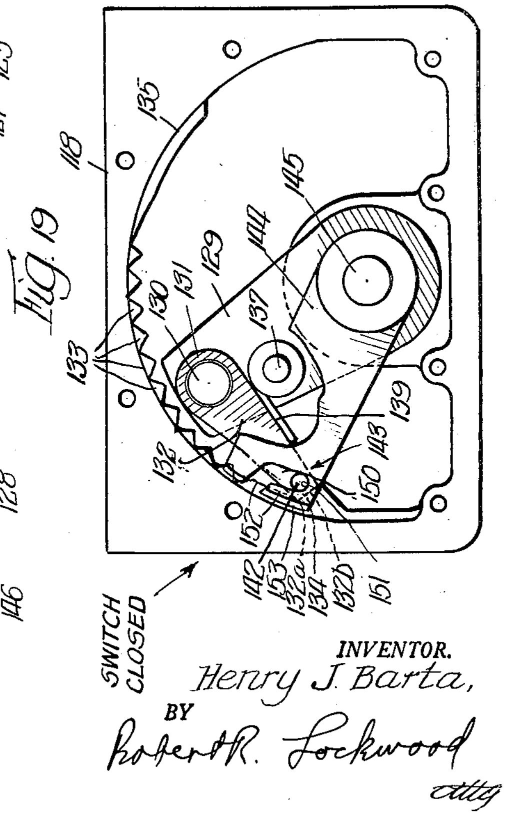

Figure 14 is a view, similar to Figure 1, and showing an alternate form of the linkage that can be employed for operating the several switch means, the arrangement here being provided with control means separate from the shaft which is rotated by the operator for insuring that the switch means are moved to the full open position in the event that there is a reversal of movement thereof in the closing direction prior to effecting complete closure of the switch means;

Figure 15 is a view, similar to Figure 1, and shows a side elevation of a portion of the mechanism shown in Figure 14;

Figure 16 is an end view of the construction shown in Figure 14 with one of the switch means and the insulators therefore being shown in elevation and a portion of the support being broken away in order to show more clearly the shaft or rotatable switch operating member;

Figure 17 is a detail sectional view, at an enlarged scale, taken generally along the line 17—17 of Figure 14 and showing the internal construction of the control means or operator which can be employed instead of the control means or operator shown in Figure 2;

Figure 18 is an elevational view of the control means or operator shown in Figure 17, looking from left to right, the cover plate being broken away in order to show the internal details of construction and the mechanism being shown in an intermediate position between the switch closed and the switch open position and being rotated toward the switch open position;

Figure 19 is a view, similar to Figure 18, the cover plate being omitted and the mechanism being shown in the switch closed position; and Figure 20 is a view, similar to Figure 19, but showing the mechanism in the switch open position.

Referring now particularly to Figures 1 and 2 of the drawings, it will be observed that the reference character 10 designates, generally, a switch or circuit interrupter support structure which may include longitudinal members 11, cross members 12 (only one being shown) and vertical members 13 all of which constitute a suitable support for a gang operated switch or circuit interrupter means, shown generally at 14, and for the control of the operation of which the present invention is employed. It will be understood that this invention is employed in conjunction with a high voltage polyphase alternating current power distribution system and that the system can be arranged to operate at different voltages as may be required. It will be noted that the switch or circuit interrupter means 14 comprises one of the poles of the multi-pole switch or circuit interrupter and provision is made for simultaneously operating them in order to interrupt each phase of the circuit simultaneously while load current flows therein. Since the switch or circuit interrupter means 14 for each phase is the same, only one is illustrated and a detailed description of the construction and operation is set forth in the application above noted.

Each switch means or circuit interrupter 14 includes a base which is provided by a pair of channel members 15 that are suitably secured near their ends to the longitudinal members 11. First, second and third insulators 16, 17 and 18 are mounted on each base for each switch means or circuit interrupter 14. The first and third insulators 16 and 18 are stationary while the intermediate second insulator 17 is rotatably mounted. A line contact member, shown generally at 19, is stationarily mounted on the first insulator 16. A line terminal, shown generally at 20, is stationarily mounted on the third insulator 18. It will be understood that the line conductors for each phase of the polyphase system are connected to the line contact member 19 and to the line terminal 20.

Rotatable with the second insulator 17 is a vertically extending shaft which projects upwardly through a metallic housing 22, as described in the application above referred to, that is held stationary with respect to the second insulator 17 and constitutes a terminal intermediate the line contact member 19 and the line terminal 20. One end of a load current interrupter, shown generally at 23, is secured to one side of the housing 22 while its other end is secured to the line terminal 20. In series with the load current interrupter 23 is a disconnecting switch that is shown generally at 24. It includes a switch blade 25 which is rotatably mounted on the housing 22 and also it is mounted to rotate about its longitudinal axis as is conventional for beaver tail type switches having high pressure contact engagement with the line contact member 19 which forms the stationary part of the disconnecting switch 24. It will be understood that the load current interrupter 23 and disconnecting switch 24 collectively comprise the switch means or circuit interrupter 14, both operating in the manner described hereinbefore for opening and closing the circuit for each phase.

The switch means or circuit interruper 14 is shown in the closed position in Figure 1 of the drawings. In this position the load current interrupter 23 is closed and the disconnecting switch 24 also is closed. As pointed out above provision is made for opening the circuit first by operation of the load current interrupter 23. This is effected during the initial portion of the rotation of the second insulator 17 from a position corresponding to the switch closed position to its position which corresponds to the switch open position. For effecting this operation the second insulator 17 is rotated about its axis through a little more than 90°. When starting to open the switch means or circuit interrupter 14, rotation of the second insulator 17 through a small arc effects rotation of the switch blade 25 about its longitudinal axis but, before it separates from the line contact member 19, the circuit has been interrupted and current ceases to flow as the result of the operation of the load current interrupter 23. On continued rotation of the second insulator 17, the switch blade 25 is swung to the open position which preferably is slightly more than 90° away from the horizontal position shown in Figure 1. During the movement of the switch blade 25 to the open position, which is essentially a vertical upright position, the spring mechanism which is released on initial movement of the second insulator 17 for operating the load current interrupter 23, is recocked and the contacts of the load current interrupter 23 are reclosed. When the second insulator 17 is rotated in the opposite direction for closing the switch means or circuit interrupter 14, the only function performed during this phase of the operation is the swinging of the switch blade 25 from the vertical position to the horizontal switch closed position terminating in a rotation of the switch blade 25 about its longitudinal axis to move it into high pressure contact engagement with the line contact member 19. The circuit is completed between the switch blade 25 and the line contact member 19 since the load current interrupter 23 is closed. The particular mechanism for accomplishing these operations by rotation of insulator 17 is described in detail in the application above referred to and, since it forms no part of the present invention, a further description thereof herein is omitted.

Once the operator has begun the sequence for opening the contacts of the load current interrupter 23 and swinging of the switch blade 25 to the open position, provision is made, as described hereinafter, for preventing a reverse movement of the second insulator 17 until the switch blade 25 has been swung to the full open position accompanied by the reclosure of the contacts in the load current interrupter 23 and recocking of its operating spring.

On operation for reclosure of the circuit, should the operator decide to reopen the switch blade 25 of each switch means or circuit interrupter 14 after he has moved it into close proximity with the respective line contact member 19, he can do so. However, the operating mechanism is so arranged that the switch blade 25, under these circumstances must be returned to the full open position and at the same time the contacts of the load current interrupter 23 are opened and subsequently closed and the operating spring mechanism therefore recocked during the final portion of the movement of the switch blade 25 to the open circuit position. As will appear hereinafter, it is not until this takes place that the operator can again attempt to close the switch means or circuit interrupter 14.

Should the operator swing the switch blade 25 into close proximity with the respective line contact member 19 and then decide not to complete the closure of the switch or circuit interrupter because ice is encountered or other mechanical obstruction is met or for other reasons, on reversal of movement of the switch blade 25 toward the open position, the load interrupter 23 is opened. This prevents the formation of a large unconfined arc. When an arc is drawn under these circumstances, the current flow therethrough is interrupted by the load interrupter 23 before a large arc can form and get out of control. As pointed out in the application above referred to, a number of tripping points are provided which permit reversal of closing movement of the switch blade 25 in the vicinity of the line contact member 19. This gives the operator considerable latitude in operation and permits him to decide when the switch blade 25 is close enough to cause an arc to strike to the line contact member 19, or to permit interruption should the switch blade 25 be touching arcing tips on the line contact member 19, or to permit interruption because the switch blade 25 is not fully seated as may be the case where ice is involved and part or all of the line contact member 19 is coated thereby. Also, the operator can proceed from a fully closed switch position.

In Figure 1 it will be noted that a rotatable fitting 26 is provided on each of the bases formed by the channel members 15 on which each insulator 17 is carried and by means of which it is rotated to effect the sequence of operations just outlined for each of the switch means or circuit interrupter 14. Extending from each rotatable fitting 26 is an arm 27 to the outer end of which one end of a link 28 is pivotally connected. As pointed out above, the switch means or circuit interrupter 14 is shown in closed position while, for illustrative purposes, the arms 27 for the other switch means are shown in positions corresponding to the open position of the switch means. The other end of the link 28 is pivotally connected to a link 29 which is secured to a shaft 30 that is journaled in a suitable bearing that is mounted on one of the channel members 15. Also fastened to the shaft 30 is an arm 32. Thus the link 29 and arm 32 rotate about a fixed pivot provided by the shaft 30. The arm 32 is pivoted to a fitting 33 that is fast on an interphase rod 34 common to the three switch means or circuit interrupters 14. Instead of a single interphase rod 34, links can be used between adjacent switch means or circuit interrupters 14. The arm 32 is secured to the shaft 30 and thereby can be adjusted readily in relation to the link 29 to accommodate variation in the spacing between the several switch means or circuit interrupters 14 and other dimensions and clearances of the entire assembly to the end that the positioning of the interphase rod 34 or other interconnecting means and connection of the fitting 33 thereto are not critical. The lengths of the links 28 and 29 and of the arm 32 are such and they are so related that the effort of the operator in opening the several switch means or circuit interrupters 14 is exerted at a maximum mechanical advantage during the cycle of operation when the load is greatest.

The interphase rod 34 is moved longitudinally from the position shown in Figure 1, corresponding to the open position of the switch means or circuit interrupter 14 to an alternate position somewhat to the left of this position which corresponds to the closed position of the switch means or circuit interrupter 14. This movement of the interphase rod 34 is accompanied by rotation of the respective arms 27 and second or rotatable insulators 17 from the open to the closed position, for example, as shown in Figure 1 by the position of the left arm 27. The operating means provided for moving the interphase rod 34 is such as to require that a complete cycle of operation be effected after a switch opening operation has been initiated. As disclosed herein the interphase rod 34 is pivotally connected at 35 to one end of a rod 36 the other end of which is pivotally connected at 37 to an arm 38 which extends radially from and rotates with a shaft or rotatable switch operating member 39. The shaft or rotatable switch operating member 39 is journalled in a bearing 40 that is carried by a bearing bracket 41 which is mounted on one side of the cross member 12 as shown in Figures 1 and 2 of the drawings. It will be observed that the shaft or rotatable switch operating member 39 is rotatable about a vertical axis and is in endwise alignment with a shaft or rotatable operating member 42 which is journalled at its lower end in a bearing bracket 43. For rotating the shaft or rotatable member 42 an arm 44 is fastened near its lower end and an operating lever 45 is pivoted to the outer end thereof. In order to rotate the shaft or rotatable operating member 42 from one position to the other, the operating lever 45 is swung upwardly about a horizontal axis at the outer end of the arm 44 and sufficient leverage then is provided to permit the operator to swing the mechanism connected thereto through an arc of somewhat less than 180° for effecting the operation of the several switch means or circuit interrupters 14 between the closed and open positions thereof. As shown in Figure 1, the shaft or rotatable switch operating member 39 and the arm 38 secured thereto are rotated in a counterclockwise direction as indicated by the arrow 46 in order to effect closure of the switch means or circuit interrupter 14. A reverse movement is required to effect the opening operation.

In order to insure that the sequence of operation is as set forth above control means or an operator, shown generally at 48 is interposed between the shaft or rotatable switch operating member 39 and the shaft or rotatable operating member 42. As will appear hereinafter, these members 39 and 42 are directly positively interconnected so that the one in effect constitutes an extension of the other. A ratchet mechanism is provided for insuring that the desired sequence of operation takes place. The control means or operator 48 is stationarily mounted on a bracket 49 which is carried by a transverse member 50 that extends between the vertical members 13. As will hereinafter appear, instead of interposing the operator 48 between the shafts 39 and 42, they can be a single shaft and the operator 48 can be mounted on one of the channel members 15 and connected directly to one of the arms 27 where the link 28 is connected thereto. In such a location the operator 48 functions solely as a control means with no operating torque being transmitted therethrough.

The details of construction and operation of the control means or operator 48 are shown more clearly in Figures 3 to 13 of the drawings. As there shown, particularly Figures 3 and 4 of the drawings, end caps 53 and 54 are provided on opposite sides of the control means or operator 48 having hollow end portions 55 and 56 which are provided with octagonal sections 57 and 58 to which the juxtaposed ends of the shafts or members 39 and 42 can be connected as by the provision of suitable clamps. The end caps 53 and 54 are non-rotatably secured by keys 59 and 60 to the respective ends of a shaft 61. The shaft 61 provides a direct connection between the shaft or rotatable switch operating member 39 and the shaft or rotatable operating member 42 previously referred to. Mechanically the shafts 39 and 42 function as a single integral shaft. When only the control function is to be performed by the control means or operator 48, connection need be had only to the end cap 53 for example, as will be apparent hereinafter. Bolts 63 and 64 extend from the respective end caps 53 and 54 into the adjacent ends of the shaft 61 and serve to prevent endwise separation. The ends of the shaft 61 are provided with ball bearings 65 and 66 which are carried by end bells 67 and 68 that are secured by bolts 69 to opposite sides of an annular housing or frame 70.

It will be understood that the end bells 67 and 68 and the housing or frame 70 are stationarily mounted by the bracket 49 and collectively constitute a housing in which the shaft 61 is rotatably mounted at its ends. As shown more clearly in Figure 5 of the drawings the housing or frame 70 is provided with inwardly facing ratchet teeth 72, 73, 74, 75 and 76 which extend over a portion of the inner periphery. The ratchet tooth 72 is provided on one side with a pawl engaging face **72*a* and on the other side with a ratcheting surface 72*b*. The other ratchet teeth are similarly provided with pawl engaging faces and ratcheting surfaces as indicated. In order to prevent further rotation of the shaft 61 in a switch closing direction, a stop tooth 77 is provided adjacent and beyond the ratchet tooth 76. It projects radially inwardly further than do any of the ratchet teeth 72 to 76. The stop tooth 77 is provided with a pawl engaging face 77*a* for engagement by an end face 78*a* of a pawl 78 which is secured to a pawl pivot 79, in the form of a short shaft, to move therewith. The pawl pivot 79 is journaled at its ends in bearing bushings 79′, Figure 4, that are carried by arms 80 of a pawl yoke 81 which is secured to the shaft 61 and rotates therewith. The pawl 78 is biased outwardly toward the ratchet teeth 72 to 76 by a biasing spring 82 which is positioned, as shown more clearly in Figure 8 of the drawings, around a roll pin 83 which extends between the arms 80 of the pawl yoke 81. One end 82*a* of the biasing spring 82 bears against the pawl 78 while the other end 82*b* bears against the hub portion of the pawl yoke 81**.

Figure 5:
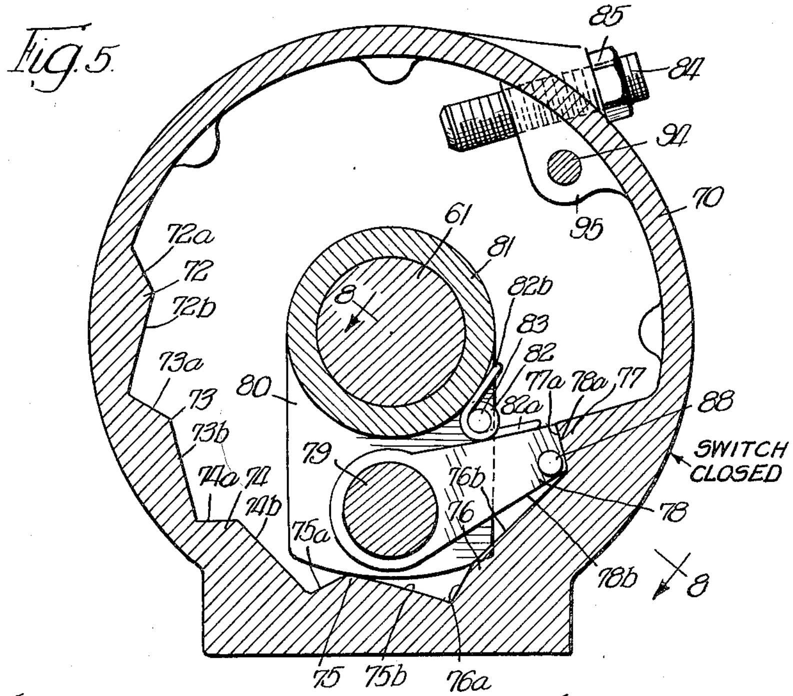
Figure 5 is a sectional view taken generally along the line 5—5 of Figure 4 and showing the position of the pawl when the circuit interrupter is in the closed position.
Figure 7:
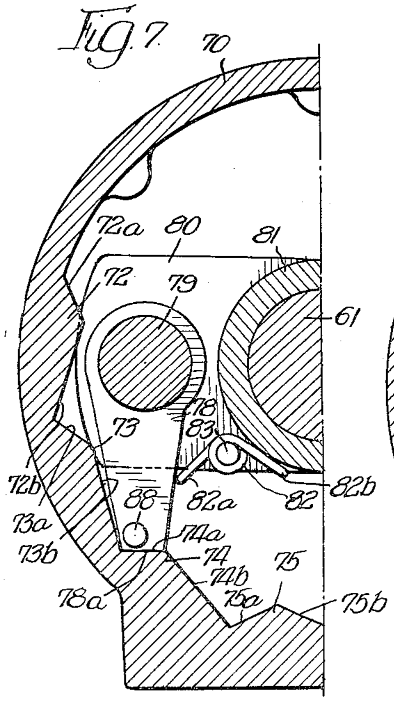
Figure 7 is a view, similar to Figures 5 and 6, but showing the pawl locked in an intermediate position of the switch during a closing operation thereof, the arrangement requiring that the operator return the rotatable operating member to the initial position before again attempting to close the circuit interrupter.
Figure 6:
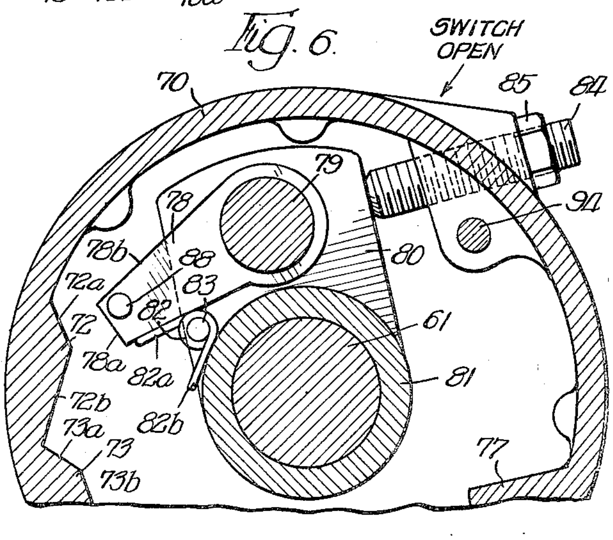
Figure 6 is a view, similar to Figure 5, but showing the relationship of the pawl to the annular housing or frame when the circuit interrupter is in the open position.

As shown in Figure 6 of the drawings the initial position of the pawl yoke 81, corresponding to the open position of the switch means or circuit interrupter 14, can be varied by an adjusting screw 84 which is threaded into the housing or frame 70 and bears against one of the arms 80. A lock nut 85 serves to hold the adjusting screw 84 in position. It will be understood that the shaft 61, together with the pawl yoke 81, can be rotated from the switch closed position, shown in Figure 5, where the end surface **78*a* of the pawl 78 engages the surface 77*a* of the stop tooth 77, to the position shown in Figure 6 where one of the arms 80 of the pawl yoke 81 engages the inner end of the adjusting screw 84**.

In accordance with this invention provision is made for controlling the position of the pawl 78 depending upon the direction in which the shaft 61 is rotated intermediate the ends of its arcuate path. For this purpose, as shown in Figure 8, a detent, indicated generally at 88, is employed. The detent 88 extends laterally from the pawl 78 and is parallel to its axis of rotation with the pawl pivot 79 on the arms 80 of the pawl yoke 81. The detent 88 is formed by a headed pin 89 which has a knurled end portion 90 that has a press fit in a drilled socket 91 which is located in one side of the pawl 78. A detent roller 92 is rotatably mounted on the intermediate portion of the headed pin 89 to minimize frictional resistance.

Figure 9:
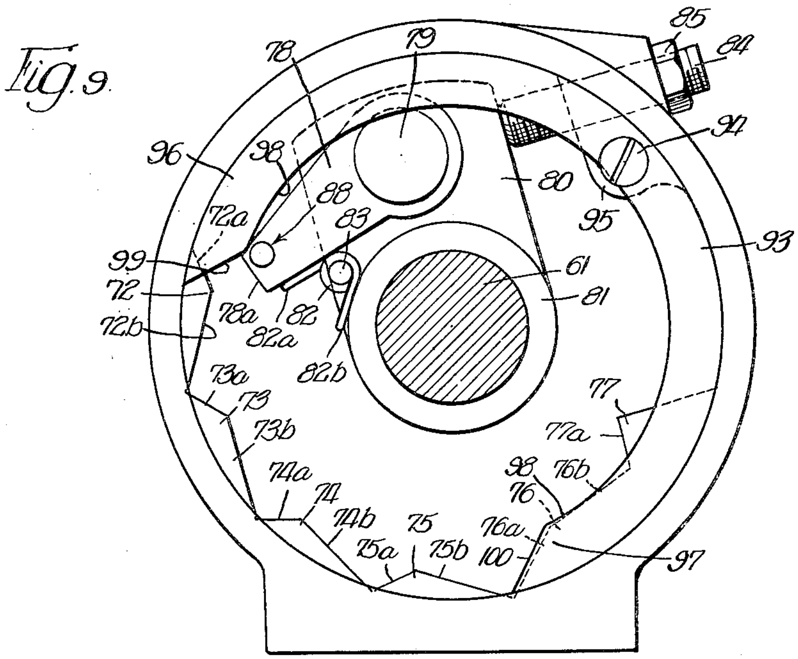
Figure 9 is a sectional view taken generally along the line 9—9 of Figure 4.

Provision is made for controlling the position of the detent 88 in turn to control the position of the pawl 78 with respect to the ratchet teeth 72 to 76. A part of the control is provided, as shown in Figure 9 of the drawings, by an arcuate pawl reset plate 93 which is secured by a screw 94 to a boss 95 which projects radially inwardly from the annular housing or frame 70. End portions 96 and 97 of the arcuate pawl reset plate 93 overlie the end ratchet teeth 72 and 76 and the detent 88 is arranged to ride over the inner surface 98 of the plate 93 at these end portions 96 and 97. The detent 88 is directed to the inner surface 98 by inclined end surfaces 99 and 100 at the extreme ends of the end portions 96 and 97 of the pawl reset plate 93.

Figures 3, 4:
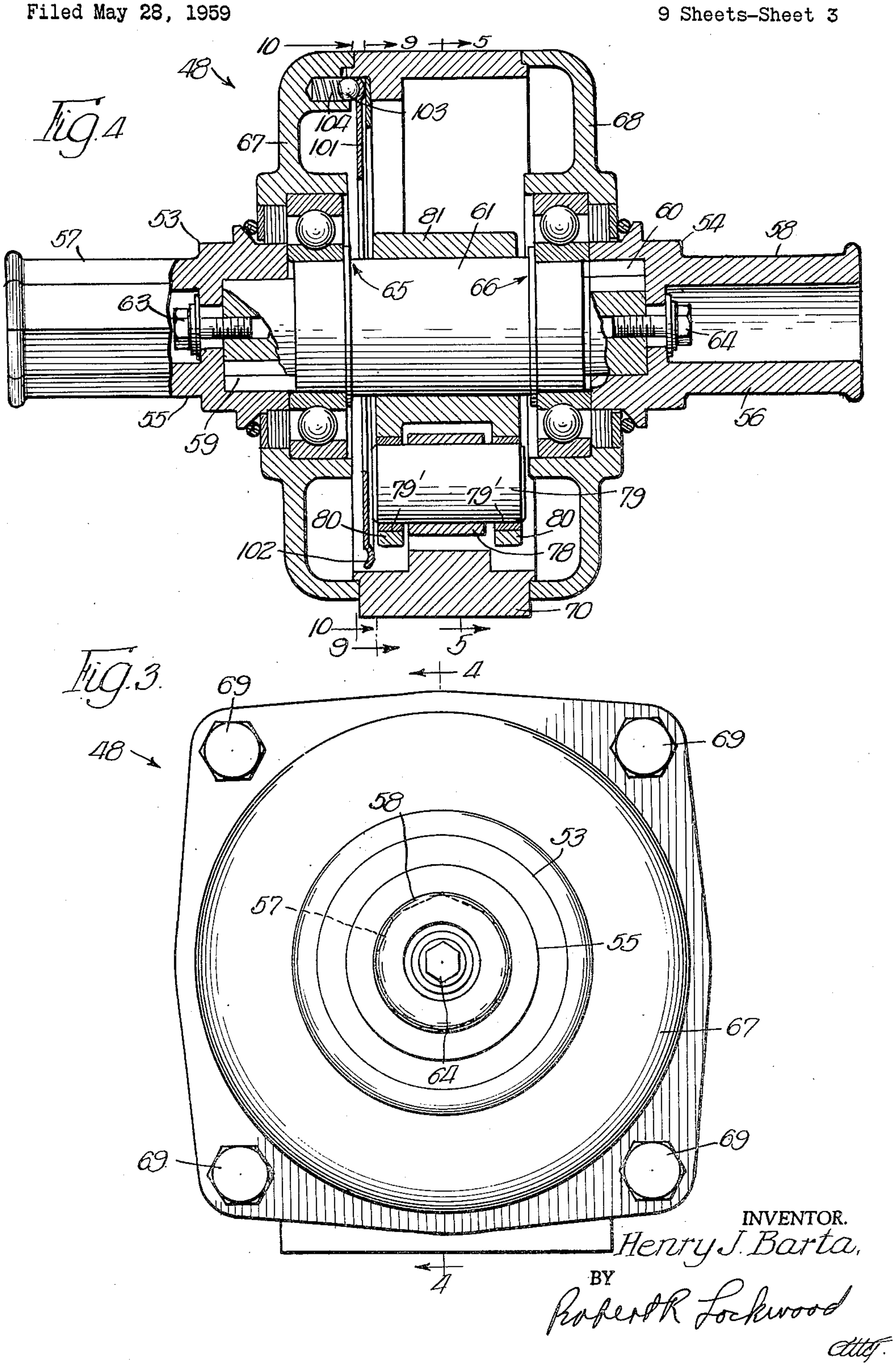
Figure 3 is a top plan view of a control means or operator in which the present invention is embodied.
Figure 4 is a vertical sectional view taken generally along the line 4—4 of Figure 3.
Figure 10:
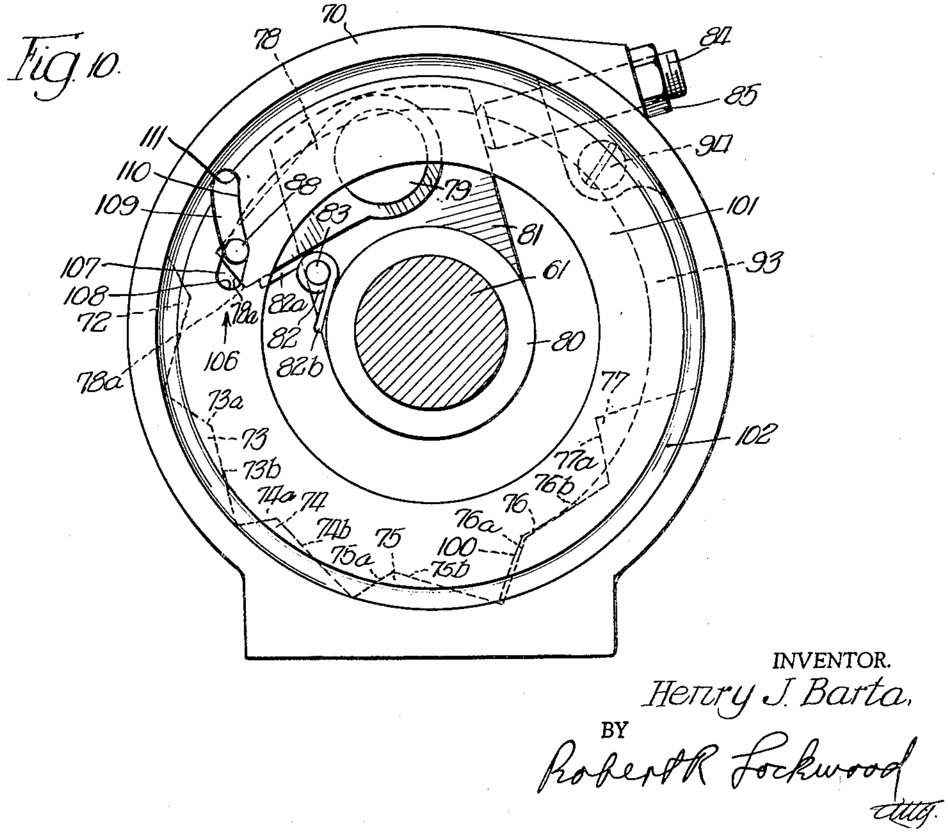
Figure 10 is a sectional view taken generally along the line 10—10 of Figure 4.

As shown in Figure 10, a further control for the detent 88 and thereby for the pawl 78 is provided by an annular detent control ring 101 which overlies the arcuate pawl reset plate 93 and is rotatably mounted in the annular housing or frame 70 at one side as shown more clearly in Figure 4. The annular detent control ring 101 is provided with an annular groove 102 for receiving a number of balls 103, preferably three in number, which are spring pressed by springs 104 that are located in drilled sockets 105 in the end bell 67.

Referring again to Figure 10 of the drawings, it will be observed that the detent 88 extends laterally through a slot which is shown generally at 106 in the annular detent control ring 101. The slot 106 is formed by two arcuate end portions. One of these end portions 107 is concentric with the annular detent control ring 101 or is located on a circle the center of which is located at the axis of rotation of the shaft 61. An end wall 108 of the end portion 107 is arranged to be engaged by the detent 88 when the shaft 61 is rotated in a counterclockwise direction, as viewed in Figure 10, to close the switch means or circuit interrupter 14. Such movement is accompanied by rotation of the annular detent control ring 101 and, as long as the counterclockwise rotation continues without reversal, the detent 88 remains in the end portion 107 of the slot 106 and the pawl 78 is held out of engagement with any of the ratchet teeth 72 to 76.

The slot 106 also includes an arcuate transverse end portion 109 which extends at an incline away from the concentric end portion 107 and is formed, in part, by a side wall 110 and an end wall 111. The arcuate transverse end portion 109 in the position shown in Figure 10 is located along a circle the center of which lies along the axis of rotation of the pawl 78 on the pawl pivot 79. As will appear hereinafter, when the shaft 61 is rotated in a reverse or clockwise direction from the direction in which it is rotated to close the switch means or circuit interrupter 14 at an intermediate position, the arcuate transverse end portion 109 of the slot 106 permits the detent 88 to swing outwardly together with the pawl 78. Then the end surface **78*a* of the pawl 78 engages the pawl engaging face of the next ratchet tooth 72 to 76, as the case may be, to prevent further rotation of the shaft 61** in a closing direction if such an attempt is made.

In describing the operation of the control means or operator 48 it will be assumed that the switch means or circuit interrupter 14 for each of the phases is in the closed position as shown for the single unit in Figure 1. Under these circumstances the pawl yoke 81 is positioned as shown in Figure 5 where the end surface **78*a* of the pawl 78 engages the face 77*a* of the stop tooth 77. The operator unlocks the operating lever 45, Figure 2, and swings it upwardly to constitute an extension of the arm 44. Then the assembly is rotated so as to rotate the shaft or rotatable operating member 42 in an opening direction which is opposite to the direction indicated by the arrow 46 in Figure 1. This operation is accompanied by rotation of the shaft 61 in a clockwise direction as viewed in Figure 5. At the beginning of this rotation the detent 88 moves out of the concentric end portion 107 of the slot 106 and into the arcuate transverse end portion 109 where it bears against the side wall 110 and causes conjoint rotation therewith of the annular detent control ring 101. The spring 82 biases the pawl 78 outwardly so that the outer side 78***b* thereof slides over the ratcheting surfaces 76*b*, 75*b*, etc. This rotation of the pawl 78 is permitted by the arcuate transverse end portion 109 of the slot 106. Since the end surface 78*a* of the pawl 78 successively is in position to engage the pawl engaging faces 76*a*, 75*a*, etc., a reverse rotation of the shaft 61 is prevented. Thus, once the operator has started to open the switch means or circuit interrupter 14 accompanied by rotation of the pawl yoke 81 and parts associated therewith in a clockwise direction as viewed in Figure 5, he cannot reverse the rotation of the shaft or rotatable operating member 42 for any greater extent than is permitted by the length of any one of the ratchet surfaces 75*b*, 74*b*, etc. Accordingly, the operator is required to swing the operating lever 45 and the shaft or rotatable operating member 42 to the fully closed position where the pawl yoke 81 is prevented, as shown in Figure 6, from further rotation in a clockwise direction by engagement of one of its arms 80 with the inner end of the adjusting screw 84. Under these conditions, as described hereinbefore, the switch blade 25 of each disconnecting switch 24 is in the open upright position, the contacts of the load current interrupter 23 have been reclosed and the spring operating mechanism therefor has been recocked. As the pawl yoke 81 approaches the position shown in Figure 6, the detent 88 engages the inclined end 99, Figure 9, of the arcuate pawl rest plate 93. This causes the detent 88 to ride into the concentric portion 107 of the slot 106 where the pawl 78 is held out of engagement with any of the ratchet teeth 72 to 76. A reverse operation of the detent 88 took place at the beginning of the opening operation when the detent 88 moved off of the inner surface 98 of the end portion 97 of the arcuate pawl reset plate 93 and downwardly over the inclined end 100 into the arcuate transverse end portion 109 of the slot 106.

Figures 11, 12, 13:
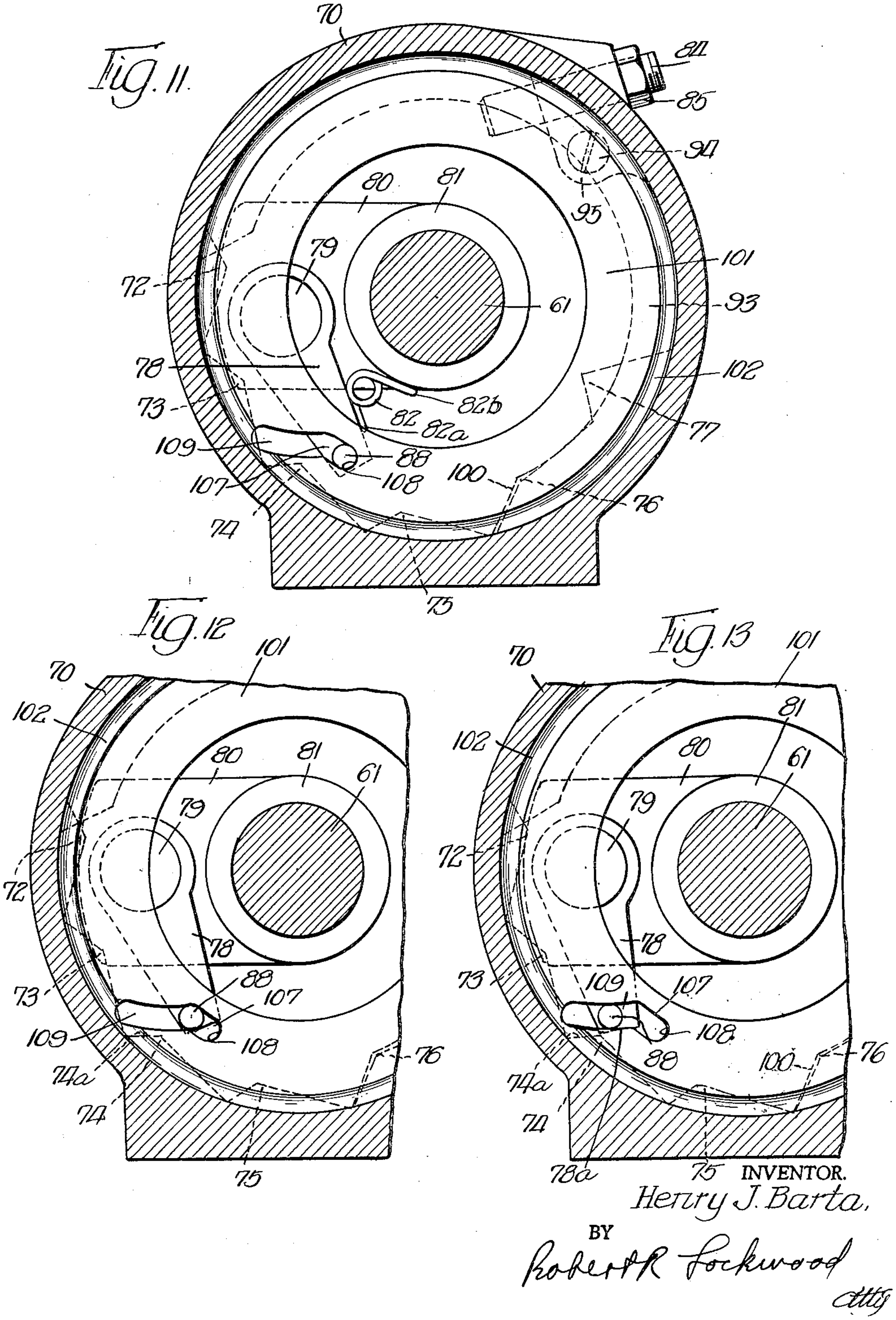
Figure 11 is a view, similar to Figure 10, showing an intermediate position of the pawl and associated parts.
Figure 12 is a view, similar to Figure 11, showing the relation of the pawl to the remaining parts of the mechanism after the rotatable operating member has been reversed in its switch closing movement.
Figure 13 is a view, similar to Figure 12, showing how the pawl engages one of the ratchet teeth on reversal of movement and prevents further closing movement until the complete closing operation is restarted from the beginning.

For closing the switch means or circuit interrupter 14, the operating lever 45 is rotated in a reverse direction to that previously described to rotate the shaft or rotatable operating member 42 in a counterclockwise direction as indicated by the arrow 46 in Figure 1. A similar rotation of the shaft 61 takes place from its position as shown in Figures 6, 9 and 10. The pawl yoke 81 rotates with the shaft 61 from the position shown in Figure 10 in a counterclockwise direction. Here it will be observed that the detent 88 is located at one end of the arcuate end portion 107 of the slot 106 to which it has been moved in the manner described above. During the initial portion of the movement of the shaft 61 and pawl yoke 81 in a counterclockwise direction, the detent 88 is moved to engage the end wall 108 and thus effects rotation of the annular detent control ring 101. As long as the counterclockwise direction of rotation is maintained, the detent 88 remains in the end portion 107 of the slot 106. An intermediate position between fully open and fully closed position is illustrated in Figure 11 of the drawings. Here it will be observed that the detent 88 engages the end wall 108 of the end portion 107 of the slot 106 and moves the annular detent control ring 101 in a counterclockwise direction.

Now it will be assumed that the operator desires to reverse the direction of closing movement of the switch blade 25 as it approaches the line contact member 19, for example, under icing conditions. The operating lever 45 then is swung to rotate the parts connected thereto, including the shaft 61, in a clockwise direction through a slight extent, for example 5°. This is indicated in Figure 12 where the detent 88 has been moved away from the end wall 108 of the arcuate end portion 107 of the slot 106 and into the arcuate transverse end portion 109 of the slot 106. If the movement in a clockwise direction continues further through a slight extent, as indicated in Figure 13, the detent 88 moves along the arcuate transverse end portion 109 of the slot 106. This permits the pawl 78 to swing outwardly and the end face 78*a* thereof to engage the pawl engaging face 74*a* of the ratchet tooth 74. After such engagement takes place, the operator no longer can continue the closing movement of the operating lever 45 or closing movement of the switch blade 25. Instead, the operating lever 45 must be swung so as to rotate the shaft 61 in a clockwise direction with the pawl 78 ratcheting past the ratchet teeth 73 and 72 until the control means or operator 48 is restored to the position shown in Figure 6 of the drawings. At the initial portion of such reverse movement, the contacts of the load current interrupter 23 are opened and then the sequence of operation proceeds as previously described for a normal opening of the switch means or circuit interrupter 14.

Referring now particularly to Figures 14, 15 and 16 of the drawings, it will be observed that the construction there shown corresponds generally to that illustrated in Figures 1 and 2 and described hereinbefore. Insofar as possible the same reference characters have been applied to the same elements although the arrangement thereof is somewhat different. Particularly, instead of placing the control means or operator 48 between the shafts 39 and 42, a corresponding device is located elsewhere and functions merely as a ratcheting device or control device with no torque being transmitted therethrough.

In order to provide for this modified arrangement the link 28 is extended by means of an extension 112 and is pivotally connected at 113 to an arm 114 which extends from a control means or operator, shown generally at 115, and which may be constructed in a manner similar to the construction for the control means or operator 48 described hereinbefore. When such a device is employed in lieu of the control means or operator 115, the arm 114 is connected to the end cap 53. While the control means or operator 48 is entirely satisfactory, the control means or operator 115, shown in more detail in Figures 17 to 20 of the drawings, is preferred since it is somewhat simpler in construction and more economical to manufacture. It will be noted in Figures 14 and 17 that the control means or operator 115 is secured to one of the channel members 15 by bolts 116. The control means or operator 115 includes a metallic housing, shown generally at 117, having a rectangular section 118 at one end into one side of which the bolts 116 are threaded. The metallic housing 117 also has a tubular section 119 which extends upwardly above the upper flange of the channel member 15 on which it is mounted.

The tubular section 119 is provided with bearings 120 near its ends in which a shaft 121 is journaled. The shaft 121 corresponds to the shaft 61 of the control means or operator 48 previously described. At the upper end of the shaft 121 there is an octagonal section 122 to which the arm 114 can be secured by suitable clamp means. At the base of the octagonal section 122 there is an annular thrust ring 123 which is secured to the shaft 121 by a radial pin 124. The thrust ring 123 bears against a thrust bearing 125 which is surrounded by an O ring 126. A dust seal ring 127 lies at the outer end of the tubular section 119 adjacent the thrust bearing 125 to preclude the entrance of foreign material into the adjacent bearing 120. At the lower end of the shaft 121 there is another thrust bearing 128.

Extending radially from the lower end of the shaft 121 is an arm 129. Preferably the arm 129 is formed integrally with the shaft 121. It extends into the rectangular section 118 and is rockable therein from the position shown in Figure 19 to the position shown in Figure 20 of the drawings.

At the outer or distal end of the arm 129 is a pawl pivot 130 which extends transversely and parallel to the axis of rotation of the shaft 121. The ends of the pawl pivot 130 extend through arms 131 of a pawl 132. It will be noted that the arms 131 straddle the arm 129. The pawl 132 has a surface 132*a* which is arranged to ratchet past ratchet teeth 133 which are located inside of the rectangular section 118 along a circle the center of which is the axis of rotation of the shaft 121. The pawl 132 also has an end surface 132*b* that is arranged to engage one side of a stop tooth 134 to prevent further rotation of the shaft 121 in the switch closing direction. The stop tooth 134 also prevents further rotation of the shaft or rotatable switch operating member 39 in the switch closing direction and thus locates the switch blade 25 properly with respect to the line content member 19 in the switch closed position.

It will be observed that the stop tooth 134 is spaced somewhat from the left end of the series of ratchet teeth 133 as shown in Figures 18, 19 and 20 of the drawings. At the other end of the ratchet teeth 133 there is an arcuate reset tooth 135 of extended length along which the surface 132*a* of the pawl 132 is arranged to slide for resetting purposes that will be described presently.

The pawl 132 is urged outwardly about the pawl pivot 130 by a coil spring 136 which is positioned around a pin 137 that extends laterally from the arm 129 intermediate its ends. One end 138 of the coil spring 136 extends into the arm 129 and is thereby anchored. The other end 139 of the coil spring 136, as shown in Figures 18, 19 and 20, bears against the underside of the pawl 132 and biases it outwardly toward the ratchet teeth 133.

In order to control the movement of the pawl 132 a detent 142 extends laterally thereof at its distal end. The detent 142 is in the form of a pin which extends parallel to the axis of rotation of the pawl 132 on the arm 129. The detent 142, which corresponds to the detent 88, previously described, extends into a slot, shown generally at 143, which is located at the distal end of a detent control arm 144 which corresponds to the annular detent control ring 101 which was previously described. The detent control arm 144 is mounted for rotation on and relative to a reduced diameter extension 145 from the shaft 121. Interposed between the pivot end of the detent control arm 144 and the adjacent end surface of a thrust washer or bearing 146 is a spiral coil spring 146'. The spring 146' urges the detent control arm 144 against a spacer washer 147 which bears against the inside of a cover plate 148 that is secured by bolts 149 to the rectangular section 118 of the metallic housing 117. In this manner the detent control arm 144 is mounted for rotation in a plane parallel to the plane of rotation of the arm 129 and yet some relative movement therebetween is permitted depending upon the relationship between the detent 142 and the transverse slot 143 in the distal end of the detent control arm 144.

The transverse slot 143 is similar in shape and function to the slot 106 in the control ring 101 previously described. The slot 143 is provided with an end portion 150 which is located along a circle the center of which is the axis of rotation of the shaft 121. The end portion 150 of the slot 143 has an end wall 151 against which the detent 142 bears when the arm 129 is rotated in a counterclockwise direction, as viewed in Figure 19, toward the switch closed position. Because of the interaction between the detent 142 and the end wall 151, the detent control arm 144 is rotated to the position shown in Figure 19.

The slot 143 also has a transverse end portion 152 which is located along a circle the center of which is located along the axis of rotation of the pawl 132 on the distal end of the arm 129. It is this portion of the slot 143 that permits the detent 142 to move outwardly and allow the end surface 132*b* of the pawl 132 to engage the right side of one of the ratchet teeth 133 so as to prevent further movement of the arm 129 in a switch closing direction in the event that the rotation has been reversed in the manner previously described.

At its outer end the detent control arm 144 is provided with an out turned flange 153 which bears against the inner side of the cover plate 148 and serves to guide the outer end of the detent control arm 144.

In operation, assuming that the several switch means 14 are closed, the shaft 39 is rotated in such a direction as to effect the rotation of the arm 129 in a clockwise direction, indicated by the arrow 154 in Figure 18. The functioning of the switch means 14 has been described hereinbefore and will not be repeated. This description will be confined to the operation of the control means or operator 115. When the operation is initiated, the end surface 132*b* of the pawl 132 bears against the juxtaposed surface of the stop tooth 134. When the rotation of the arm 129 in the direction indicated by the arrow 154 takes place, the detent 142 is moved to engage one side of the transverse end portion 152 of the slot 143. This causes the detent control arm 144 to rotate conjointly with the arm 129 in a clockwise direction. As the movement continues the surface 132*a* ratchets past the ends of the ratchet teeth 133 but there is no interference with the movement of the arm 129 in the clockwise direction.

Now assuming that the operator continues the movement of the shaft 39 in the opening direction, the rotation of the arm 129 continues to the position shown in Figure 20 of the drawings through the position shown in Figure 18. Here it will be observed that the surface 132*a* engages the arcuate inner surface of the reset tooth 135. The length of this tooth 135 is sufficient to hold the detent 142 in registry with the end portion 150 of the transverse slot 143 long enough to insure that it enters this end portion 150 when the arm 129 is rotated in a counterclockwise direction to effect closure of the switch means 14 and particularly of the disconnecting switch blade 25.

Now assuming that the switch closing operation is being performed and the arm 129 is rotated to a position corresponding to the position of the switch blade 25 adjacent the line contact member 19 and further assuming that at this time the operator decides to reverse his movement and move the switch blade 25 toward the open position, he can do this. Accordingly, the rotation of the shaft 39 is reversed and the arm 129 again is moved toward the switch open position. Because of the provision of the end portion 150 of the transverse slot 143 and the holding of the detent control arm 144 frictionally against the spacer washer 147, the detent control arm 144 does not move conjointly with the arm 129. As a result the detent 142 is permitted to move out of the end portion 150 and into the transverse end portion 152 of the slot 143 and the end surface 132*b* of the pawl 132 then bears against one side of one of the ratchet teeth 133. Now should the operator attempt to reclose the switch or again move the arm 129 in a counterclockwise direction, he is prevented from doing so. The only movement that can be effected is rotation of the arm 129 in a clockwise direction until the switch blade 25 for each of the switch means 14 has been moved to the full open position and the accompanying sequence of operations in the switch means 14 effected.

Since certain further changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. Control means for connection to a switch operating member movable in opposite directions to close and to open a switch, said control means comprising, in combination, a stationary housing having ratchet teeth facing inwardly over a portion of its inner periphery, a shaft journaled on said housing and providing a connection to said switch operating member, an arm secured to and extending radially from said shaft, a pawl pivoted at one end to said arm and biased toward engagement with said ratchet teeth, a detent mounted on the distal end of said pawl and extending laterally therefrom, and a detent control member rotatably mounted in said housing having a transversely extending slot through which said detent projects to permit said pawl to engage the next tooth of said ratchet teeth to prevent further rotation of said shaft in one direction should said shaft be rotated in a reverse direction through a limited extent and then said shaft be rotated in said one direction.

2. Control means for connection to a switch operating member movable in opposite directions to close and to open a switch, said control means comprising, in combination, a stationary housing having ratchet teeth facing inwardly over a portion of its inner periphery, a shaft journaled on said housing and providing a connection to said switch operating member, an arm secured to and extending radially from said shaft, a pawl pivoted at one end to said arm and biased toward engagement with said ratchet teeth, a detent mounted on the distal end of said pawl and extending laterally therefrom, means on said housing adjacent one end of said ratchet teeth to hold said pawl inwardly of said ratchet teeth, and a detent control member rotatably mounted in said housing about the axis of rotation of said shaft and having a transversely extending slot through which said detent projects to permit said pawl to engage the next tooth of said ratchet teeth to prevent further rotation of said shaft in one direction should said shaft be rotated in a reverse direction through a limited extent and then said shaft be rotated in said one direction.

3. Control means for connection to a switch operating member movable in opposite directions to close and to open a switch, said control means comprising, in combination, a stationary housing having ratchet teeth facing inwardly over a portion of its inner periphery, a shaft journaled on said housing and providing a connection to said switch operating member, an arm secured to and extending radially from said shaft, a pawl pivoted at one end to said arm and biased toward engagement with said ratchet teeth, a detent mounted on the distal end of said pawl and extending laterally parallel to the pivot axis of said pawl on said arm and a detent control member rotatably mounted in said housing about the axis of rotation of said shaft, said detent control member having a slot through which said detent projects, said slot having one portion concentric with said axis of rotation of said shaft to hold said pawl out of engagement with said ratchet teeth and at one end engaged by said detent to rotate said detent control member therewith, said slot having another portion extending outwardly from the other end of said one portion to receive said detent and permit said pawl to engage the next tooth of said ratchet teeth to prevent further rotation of said shaft in one direction should said shaft be rotated in a reverse direction through a limited extent and then said shaft be rotated in said one direction.

4. Control means for connection to a switch operating member movable in opposite directions to close and to open a switch, said means comprising, in combination, a stationary housing having ratchet teeth facing inwardly over a portion of its inner periphery, a shaft journaled on said housing and providing a connection to said operating member, an arm secured to and extending radially from said shaft, a pawl pivoted at one end to said arm and biased toward engagement with said ratchet teeth, a detent mounted on the distal end of said pawl and extending laterally parallel to the pivot axis of said pawl on said arm, and a detent control member rotatably mounted in said housing about the axis of rotation of said shaft, said detent control member having a slot through which said detent projects, said slot having one portion concentric with said axis of rotation of said shaft to hold said pawl out of engagement with said ratchet teeth and at one end engaged by said detent to rotate said detent control member therewith, said slot having another portion extending outwardly from the other end of said one portion and concentric with said pivot axis of said pawl to receive said detent and permit said pawl to engage the next tooth of said ratchet teeth to prevent further rotation of said shaft in one direction should said shaft be rotated in a reverse direction through a limited extent and then said shaft be rotated in said one direction.

5. Control means for connection to a switch operating member movable in opposite directions to close and to open a switch, said means comprising, in combination, a stationary housing having ratchet teeth facing inwardly over a portion of its inner periphery, a shaft journaled on said housing and providing a connection to said switch operating member, an arm secured to and extending radially from said shaft, a pawl pivoted at one end to said arm and biased toward engagement with said ratchet teeth, a detent mounted on the distal end of said pawl and extending laterally parallel to the pivot axis of said pawl on said arm, a detent control member rotatably mounted in said housing about the axis of rotation of said shaft, said detent control member having a slot through which said detent projects, said slot having one portion concentric with said axis of rotation of said shaft to hold said pawl out of engagement with said ratchet teeth and one end engaged by said detent to rotate said control member therewith, said slot having another portion extending outwardly from the other end of said one portion and concentric with said pivot axis of said pawl to receive said detent and permit said pawl to engage the next tooth of said ratchet teeth to prevent further rotation of said shaft in one direction should said shaft be rotated in a reverse direction through a limited extent and then said shaft be rotated in said one direction, and reset means at the end of said ratchet teeth toward which said pawl is rotated in said reverse direction for moving said detent inwardly of said ratchet teeth and into registry with said one portion of said slot.

6. Control means for connection to a switch operating member movable in one direction to close a switch and in the opposite direction to open the switch, said control means comprising, in combination, a stationary housing having ratchet teeth facing inwardly over a portion of its inner periphery, a shaft journaled on said housing and providing a connection to said switch operating member, a yoke secured to said shaft, a pawl pivoted at one end to said yoke and biased toward engagement with said ratchet teeth, a detent mounted on the distal end of said pawl and extending laterally parallel to the pivot axis of said pawl on said yoke, means on said housing adjacent the end ratchet teeth respectively to hold said pawl inwardly of said ratchet teeth, and a detent control member rotatably mounted in said housing laterally of said ratchet teeth and having a transversely extending slot through which said detent projects to permit said pawl to engage the next tooth of said ratchet teeth to prevent further rotation of said shaft in one direction should said shaft be rotated in a reverse direction through a limited extent and then said shaft be rotated in said one direction.

7. Control means for connection to a switch operating member movable in one direction to close a switch and in the opposite direction to open the switch, said control means comprising, in combination, a stationary housing having ratchet teeth facing inwardly over a portion of its inner periphery, a shaft journaled on said housing and providing a connection to said switch operating member, a yoke secured to said shaft, a pawl pivoted at one end to said yoke and biased toward engagement with said ratchet teeth, a detent mounted on the distal end of said pawl and extending laterally parallel to the pivot axis of said pawl on said yoke, means on said housing adjacent the end ratchet teeth respectively to hold said pawl inwardly of said end ratchet teeth, and a detent control member rotatably mounted in said housing about the axis of rotation of said shaft and laterally of said ratchet teeth, said detent control member having a slot through which said detent projects, said slot having one portion concentric with said axis of rotation of said shaft to hold said pawl out of engagement with said ratchet teeth and at one end engaged by said detent to rotate said detent control member therewith, said slot having another portion extending outwardly from the other end of said one portion to receive said detent and permit said pawl to engage the next tooth of said ratchet teeth to prevent further rotation of said shaft in one direction should said shaft be rotated in a reverse direction through a limited extent and then said shaft be rotated in said one direction.

8. Control means for connection to a switch operating member movable in one direction to close a switch and in the opposite direction to open the switch, said control means comprising, in combination, a stationary housing having ratchet teeth facing inwardly over a portion of its inner periphery along a circle, a shaft journaled about the center of said circle on said housing and providing a connection to said switch operating member, a yoke secured to said shaft, a pawl pivoted at one end to said yoke and biased toward engagement with said ratchet teeth, a detent mounted on the distal end of said pawl and extending laterally parallel to the pivot axis of said pawl on said yoke, an arcuate pawl reset plate secured to said housing with its ends overlying one side of the end ratchet teeth respectively and extending throughout the remaining portion of the periphery of said housing and the inner surface at said ends underlying said detent to hold said pawl out of engagement with said end ratchet teeth, and a detent control member rotatably mounted in said housing laterally of said ratchet teeth and having a transversely extending slot through which said detent projects to permit said pawl to engage the next tooth of said ratchet teeth to prevent further rotation of said shaft in a switch closing direction should said shaft be rotated in a reverse direction through a limited extent and then said shaft be rotated in a switch closing direction.

9. Control means for connection to a switch operating member movable in one direction to close a switch and in the opposite direction to open the switch, said control means comprising, in combination, a stationary annular housing having ratchet teeth facing inwardly over a portion of its inner periphery, a shaft journaled at its ends on said annular housing and providing a connection to said switch operating member, a yoke secured to said shaft, a pawl pivoted at one end to said yoke and biased toward engagement with said ratchet teeth, a detent mounted on the distal end of said pawl and extending laterally parallel to the pivot axis of said pawl on said yoke, and an annular detent control ring rotatably mounted in said housing laterally of said ratchet teeth, said annular detent control ring having a slot through which said detent projects, said slot having one portion concentric with said annular detent control ring to hold said pawl out of engagement with said ratchet teeth and at one end engaged by said detent to rotate said annular detent control ring therewith, said slot having another portion extending from the other end of said one portion toward the outer periphery of said annular detent control ring to receive said detent and permit said pawl to engage the next tooth of said ratchet teeth to prevent further rotation of said shaft in a switch closing direction should said shaft be rotated in a reverse direction through a limited extent and then said shaft be rotated in a switch closing direction.

10. Control means for connection to a switch operating member movable in one direction to close a switch and in the opposite direction to open the switch, said control means comprising, in combination, a stationary housing having ratchet teeth facing inwardly over a portion of its inner periphery along a circle and a stop tooth extending inwardly further than said ratchet teeth, a shaft journaled about the center of said circle on said annular housing and providing a connection to said operating member, a yoke secured to said shaft, a pawl pivoted at one end to said yoke and biased toward engagement with said ratchet teeth and said stop tooth, a detent mounted on the distal end of said pawl and extending lateral parallel to the pivot axis of said pawl on said yoke, an arcuate pawl reset plate secured to said housing with its ends overlying one side of the end ratchet teeth respectively and extending throughout the remaining portion of the periphery of said housing and the inner surface at said ends underlying said detent to hold said pawl out of engagement with said end ratchet teeth, and an annular detent control ring rotatably mounted in said housing laterally of said ratchet teeth, said annular detent control ring having a slot through which said detent projects, said slot having one portion concentric with said annular detent control ring to hold said pawl out of engagement with said ratchet teeth and at one end engaged by said detent to rotate said annular detent control ring therewith, said slot having another portion extending from the other end of said one portion toward the outer periphery of said annular detent control ring to receive said detent and permit said pawl to engage the next tooth of said ratchet teeth to prevent further rotation of said shaft in a switch closing direction should said shaft be rotated in a reverse direction through a limited extent and then said shaft be rotated in a switch closing direction.

11. Control means for connection to a switch operating member movable in one direction to close a switch and in the opposite direction to open the switch, said control means comprising, in combination, a stationary annular housing having ratchet teeth facing inwardly over a portion of its inner periphery and a stop tooth extending inwardly further than said ratchet teeth, a shaft journaled on said annular housing and providing a connection to said operating member, a yoke secured to said shaft, a pawl pivoted at one end to said yoke and biased toward engagement with said ratchet teeth and said stop tooth, a detent mounted on the distal end of said pawl and extending laterally parallel to the pivot axis of said pawl on said yoke, an arcuate pawl reset plate secured to said housing with its ends overlying one side of the end ratchet teeth respectively and extending throughout the remaining portion of the periphery of said housing and the inner surface at said ends underlying said detent to hold said pawl out of engagement with said end ratchet teeth, the ends of said arcuate pawl reset plate being inclined toward said inner surface thereof to direct said detent thereto, a stop on said housing engaging said pawl yoke and determining the initial position thereof corresponding to the open position of said switch, and an annular detent control ring overlying said arcuate pawl reset plate and rotatably mounted in said housing and having a transversely extending slot through which said detent projects to permit said pawl to engage the next tooth of said ratchet teeth to prevent further rotation of said shaft in a switch closing direction should said shaft be rotated in a reverse direction through a limited extent before said pawl engages said stop tooth and then said shaft be rotated in a switch closing direction.

12. Control means for connection to a switch operating member movable in one direction to close a switch and in the opposite direction to open the switch, said control means comprising, in combination, a stationary annular housing having ratchet teeth facing inwardly over a portion of its inner periphery and a stop tooth extending inwardly further than said ratchet teeth, a shaft journaled at its ends on said annular housing and providing a connection to said operating member, a yoke secured to said shaft, a pawl pivoted at one end to said yoke and biased toward engagement with said ratchet teeth and said stop tooth, a detent mounted on the distal end of said pawl and extending laterally parallel to the pivot axis of said pawl on said yoke, means on said housing adjacent the end ratchet teeth respectively to hold said pawl out of engagement with said end ratchet teeth, a stop on said housing engaging said pawl yoke and determining the initial position thereof corresponding to the open position of said switch, and an annular detent control ring rotatably mounted in said housing laterally of said ratchet teeth, said annular detent control ring having a slot through which said detent projects, said slot having one portion concentric with said annular detent control ring to hold said pawl out of engagement with said ratchet teeth and at one end engaged by said detent to rotate said annular detent control ring therewith, said slot having another portion extending from the other end of said one portion toward the outer periphery of said annular detent control ring to receive said detent and permit said pawl to engage the next tooth of said ratchet teeth to prevent further rotation of said shaft in a switch closing direction should said shaft be rotated in a reverse direction through a limited extent before said pawl engages said stop tooth and then said shaft be rotated in a switch closing direction.

13. Control means for connection to a switch operating member movable in one direction to close a switch and in the opposite direction to open the switch, said control means comprising, in combination, a stationary housing having ratchet teeth facing inwardly over a portion of its inner periphery, a shaft journaled on said housing and providing a connection to said switch operating member, an arm secured to and extending radially from said shaft, a pawl pivoted at one end to said arm and biased toward engagement with said ratchet teeth, a detent mounted on the distal end of said pawl and extending laterally parallel to the pivot axis of said pawl on said arm, and a detent control arm rotatably mounted on said shaft and having a transversely extending slot through which said detent projects to permit said pawl to engage the next tooth of said ratchet teeth to prevent further rotation of said shaft in one direction should said shaft be rotated in a reverse direction through a limited extent and then said shaft be rotated in said one direction.

14. Control means for connection to a switch operating member movable in one direction to close a switch and in the opposite direction to open the switch, said control means comprising, in combination, a stationary housing having ratchet teeth facing inwardly over a portion of its inner periphery, a shaft journaled on said housing and providing a connection to said switch operating member, an arm secured to and extending radially from said shaft, a pawl pivoted at one end to said arm and biased toward engagement with said ratchet teeth, a detent mounted on the distal end of said pawl and extending laterally parallel to the pivot axis of said pawl on said arm, a detent control arm rotatably mounted in said housing about the axis of said shaft, said detent control arm having a slot through which said detent projects, said slot having one portion concentric with said axis of rotation of said shaft to hold said pawl out of engagement with said ratchet teeth and at one end engaged by said detent to rotate said detent control member therewith, said slot having another portion extending outwardly from the other end of said one portion to receive said detent and permit said pawl to engage the next tooth of said ratchet teeth to prevent further rotation of said shaft in one direction should said shaft be rotated in a reverse direction through a limited extent and then said shaft be rotated in said one directon, and reset means at the end of said ratchet teeth toward which said pawl is rotated in said reverse direction for engaging said pawl and moving said detent inwardly of said ratchet teeth and into registry with said one portion of said slot.

15. Control means for connection to a switch operating member movable in one direction to close a switch and in the opposite direction to open the switch, said control means comprising, in combination, a stationary housing having ratchet teeth facing inwardly over a portion of its inner periphery, a shaft journaled on said housing and providing a connection to said switch operating member, an arm secured to and extending radially from said shaft, a pawl pivoted at one end to said arm and biased toward engagement with said ratchet teeth, a detent mounted on the distal end of said pawl and extending laterally parallel to the pivot axis of said pawl on said arm, and a detent control arm rotatably mounted at one end in said housing about the axis of rotation of said shaft and its other end laterally of said ratchet teeth, said detent control arm having a slot at said other end through which said detent projects, said slot having one portion concentric with said axis of rotation of said shaft to hold said pawl out of engagement with said ratchet teeth and at one end engaged by said detent to rotate said detent control arm therewith, said slot having another portion extending from the other end of said one portion toward the outer end of said detent control arm to receive said detent and permit said pawl to engage the next tooth of said ratchet teeth to prevent further rotation of said shaft in a switch closing direction should said shaft be rotated in a reverse direction through a limited extent and then said shaft be rotated in a switch closing direction.

16. Control means for connection to a switch operating member movable in one direction to close a switch and in the opposite direction to open the switch, said control means comprising, in combination, a stationary housing having ratchet teeth facing inwardly over a portion of its inner periphery, a shaft journaled on said housing and providing a connection to said switch operating member, an arm secured to and extending radially from said shaft, a pawl pivoted at one end of said arm and biased toward engagement with said ratchet teeth, a detent mounted on the distal end of said pawl and extending laterally parallel to the pivot axis of said pawl on said arm, a detent control arm rotatably mounted on said shaft and having a transversely extending slot through which said detent projects to permit said pawl to engage the next tooth of said ratchet teeth to prevent further rotation of said shaft in a switch closing direction should said shaft be rotated in a reverse direction through a limited extent and then said shaft be rotated in a switch closing direction, and a reset member at the end of said ratchet teeth toward which said pawl is rotated in said reverse direction having an arcuate surface engageable by said pawl for moving said detent inwardly of said ratchet teeth.

17. Control means for connection to a switch operating member movable in one direction to close a switch and in the opposite direction to open the switch, said control means comprising, in combination, a stationary housing having ratchet teeth facing inwardly over a portion of its inner periphery, a shaft journaled on said housing and providing a connection to said switch operating member, an arm secured to and extending radially from said shaft, a pawl pivoted at one end to said arm and biased toward engagement with said ratchet teeth, a detent mounted on the distal end of said pawl and extending laterally parallel to the pivot axis of said pawl on said arm, a detent control arm rotatably mounted at one end in said housing about the axis of rotation of said shaft and its other end laterally of said ratchet teeth, said detent control arm having a slot at said other end through which said detent projects, said slot having one portion concentric with said axis of rotation of said shaft to hold said pawl out of engagement with said ratchet teeth and at one end engaged by said detent to rotate said detent control arm therewith, said slot having another portion extending from the other end of said one portion toward the outer end of said detent control arm and concentric with said pivot axis of said pawl to receive said detent and permit said pawl to engage the next tooth of said ratchet teeth to prevent further rotation of said shaft in a switch closing direction should said shaft be rotated in a reverse direction through a limited extent and then said shaft be rotated in a switch closing direction, and a reset member on said housing at the end of said ratchet teeth toward which said pawl is rotated in said reverse direction having an arcuate surface engageable by said pawl for moving said detent inwardly of said ratchet teeth and into registry with the said one portion of said slot.

References Cited in the file of this patent

UNITED STATES PATENTS 1,074,054 Kuntzler -------------- Sept. 23, 1913
2,892,351 McCarty --------------- June 30, 1959

FOREIGN PATENTS 813,672 France ------------------ Mar. 1, 1937